Sept. 5, 1944.              E. F. MARTINEC              2,357,597
                            BEARING MOUNTING
                          Filed June 16, 1942          3 Sheets-Sheet 1

INVENTOR
EUGENE F. MARTINEC
C.P. Goepel
ATTORNEY

Sept. 5, 1944. E. F. MARTINEC 2,357,597
BEARING MOUNTING
Filed June 16, 1942 3 Sheets-Sheet 2

INVENTOR.
EUGENE F. MARTINEC
BY C. P. Goepel
ATTORNEY

Sept. 5, 1944.  E. F. MARTINEC  2,357,597
BEARING MOUNTING
Filed June 16, 1942  3 Sheets-Sheet 3

INVENTOR.
EUGENE F. MARTINEC
BY
C. P. Goepel
ATTORNEY

Patented Sept. 5, 1944

2,357,597

UNITED STATES PATENT OFFICE 2,357,597

BEARING MOUNTING

Eugene F. Martinec, Cleveland, Ohio, assignor to Norma-Hoffmann Bearings Corporation, Stamford, Conn., a corporation of New York Application June 16, 1942, Serial No. 447,231

2 Claims. (Cl. 308—184)

This invention relates to bearing mountings.

The object of the invention is to provide means operative in connection with ball bearings whereby pitting of races is prevented, and secondly to prevent creep, slippage or movement of bearing parts with respect to adjacent mounting members.

One of the disadvantages attendant the use of ball bearings is the pitting of races by balls held therein. When a ball bearing is suddenly subjected to a sharp shock or to an excessive impact load which translates its force to a ball bearing in a manner not contemplated by the design and structure of such a ball bearing, the entire force, or almost the entire force, is suddenly applied at an axially inclined angle to one or more of the balls, and the race is indented or pitted. Such indenting or pitting takes place adjacent the marginal portion of the race, and upon the rotation of the race, the balls rolling over these pits are caused to vibrate severely, with resultant increased roughness, due to the depth of the pitting. Many attempts have been made to prevent this pitting. Frequently, it happens that manufacturers supplying their customers, are required to send repair or service men to their customers in the belief that faulty ball bearings have been delivered, only to find that such bearings had been subjected to forces causing such pitting. Attempts to solve this problem to prevent such pitting caused by sharp blows have been unsuccessful. The annual damage loss is very great, to say nothing of the loss of time awaiting repair or substitute bearings.

The matter of pitting becomes especially pronounced when ball bearings are used with articles, the use or abuse of which causes the bearings to be subjected to sudden diagonal loads in the form of sharp shock applications.

It has been found that when small motors or small units are mishandled in assembly or in shipment, and dropped for example, then such pitting also results.

Ordinary roller skates for example employing ball bearings of the general types like crudely made cup and cone or thrust bearings have the disadvantage of easily tiring the users, while those employing precision or low friction bearings avoid this disadvantage, but have another disadvantage that a noise is produced due to certain mounting parts sliding or vibrating, which is shrill, disagreeable, and frequently interferes with the accompanying music attendant fancy figure skating for public exhibition purposes. This situation becomes greatly aggravated when the races have been pitted.

The present invention solves this problem and provides means first to prevent such pitting, and secondly, to prevent creeping or relative movement of the outer race in its housing, and in respect to other mounting parts.

The invention consists in the provision of resilient means interposed between the ball bearings and the application of a diagonal force or excessive load impact line, to enable these means to absorb such an impact load, such means having sufficient inherent resiliency to provide a safety factor reservoir over the highest expected sharp impact load for that size of bearing. Such means consist of an interposed block of rubber or synthetic rubber, of a weight, thickness and consistency of porosity which will absorb the shock without reaching its elastic limit, so that a further potential of inherent resiliency remains. That may be called a reservoir of inherent resiliency.

The invention consists also in providing a stationary structure which seats against the outer face of the outer race ring and which structure has a surface contiguous to that face, so that the contiguous faces so interlock, or frictionally hug, so that the stationary surface holds the face of the race ring, and the outer race ring is prevented from rotation. Likewise this stationary structure has a similar face in contact with the face of the opposite housing member so that these contiguous faces likewise interlock and are prevented from having any relative movement or rotation. This novel structure is one of planular area so that all air is excluded between the contiguous surfaces and thereby a secure holding effect is obtained. With such a stationary structure, this outer race ring is prevented from rotating in respect to its housing or other enclosing portion like the outer wheel or roller of a roller skate bearing.

The foregoing inventions may be used separately or jointly. With an outer race ring held by suitable means against rotation, the shock absorbing layer will prevent pitting. If pitting is not likely to arise, the slippage preventing means may be used. Or, they may be used together, as hereinafter described.

A structure embodying the invention may be in the form of separate shims resting against a body of rubber which body acts as a reservoir of inherent resiliency to absorb the shock load, or, the latter may be provided integrally with such surfaces or shims.

The invention contemplates placing this layer of material having a reservoir of inherent resiliency directly in the path of a diagonal sharp shock load, so as to absorb the same more directly than when such material is so placed as to absorb only lateral loads. This diagonal thrust absorbing portion preferably also has a film on its surfaces so as to prevent rotation of the outer race ring in respect to its enclosing member.

The invention contemplates also the selection of such rubber for the inherent resiliency reservoir that it still has a surplus compression factor beyond that necessary to absorb the shock load, and also the selection of such hardness as may be co-related thereto.

By rubber is intended to be included natural rubber, synthetic rubber or similar flexible compressible material.

The invention will be further described hereinafter, embodiments will be shown in the drawings, and the invention will be finally pointed out in the appended claims.

In the accompanying drawings—

Similar reference characters indicate like parts throughout the several views.

Figure 1:
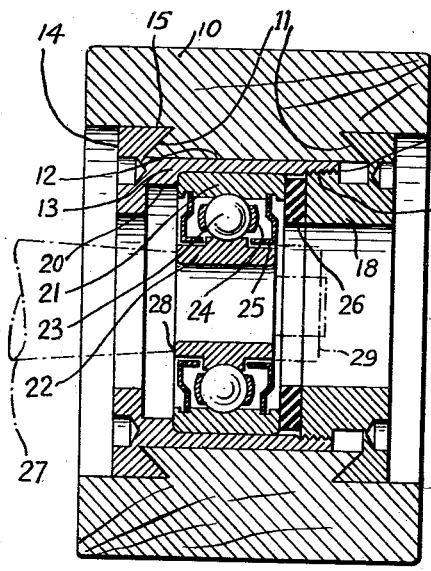
Fig. 1 is a central section of a ball bearing embodying the pitting preventing invention applied to a roller skate wheel.

Referring to the drawings, and more particularly to Figure 1, the ball bearing therein shown is applied to a roller skate wheel, of the type shown and claimed in my copending application, Ser. No. 372,156, filed December 28, 1940, now matured into Patent No. 2,304,944, issued December 15, 1942. The outer rim 10 has a wedge shaped interiorly extending member 11, the bore 12 of which is engaged by a ring shaped housing member 13, which has at one end a ring shaped projection 14 engaging the recess 15 of the rim or roller 10. Adjacent this end but interiorly of the housing member 13, a shoulder 20 is provided. The outer end of the housing member 13 has an interior screw-threaded portion 16, adapted to be engaged by an exterior screw-threaded portion 17 of a nut member 18. An anti-friction bearing consisting of an outer race ring 21, an inner race ring 22, balls 23, a ball-bearing cage 24 and dust seals 25, has its outer race ring disposed against the shoulder 20, and is held against the shoulder by the nut member 18, through the instrumentality of a rubber washer 26, which will be hereinafter described more in detail. The inner race ring 22 is secured to a shaft 27 shown in dotted lines, by the inner race ring seating at one side, against a shoulder 28 of the shaft and by a nut 29 having an interior thread (not shown) engaging an exterior thread (not shown) at the end of the shaft 27, the nut pressing against the free end of the inner race ring when properly applied.

The rubber washer 26 has one surface facing and contacting with the outer planular surface of the outer race ring 21, and another surface parallel therewith contacting with the planular surface of the contiguous nut member 18.

The third surface of the rubber washer or layer is the perimeter surface and this is spaced from the inner circumferential surface of the housing member 13 to allow for the flow of the rubber if pressed to a still greater degree than shown in Fig. 1 and until it will press against this housing bore.

The fourth and radially innermost circumferential surface of the washer is free and may flow inwardly if further pressure be applied. In this particular embodiment shown in Fig. 1 that surface of the rubber layer or washer which contacts with the outer race ring extends beyond the outer race ring inwardly toward the shaft and is free of any contacting or opposing surface.

The foregoing structure and description is part of the aforesaid application, Ser. No. 372,156, filed December 28, 1940, and the action thereof with further improvements thereon will now be described.

Figures 2, 3:
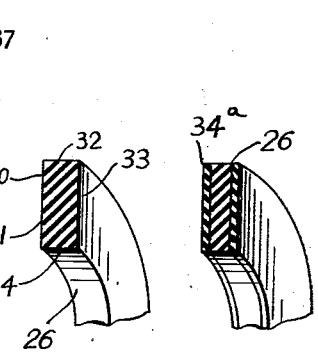
Fig. 2 is a perspective fragment of a rubber ring broken away.
Fig. 3 is a perspective fragment of the rubber ring shown in Fig. 2, but provided integrally with friction surfaces or films.

The rubber layer 26 of Fig. 1 is shown in Fig. 2, and in the form shown in Fig. 2 it corresponds to that shown in Fig. 1, namely, it is under partial compression; the part 30 is the surface which contacts with the bearing outer ring, the surface 32 is the perimeter surface, the surface 33 is that surface which contacts with the contiguous surface of the nut member, and the surface 34 is the inward circumferential surface. The rubber as shown in Figs. 1 and 2 is so arranged and so acted upon by the pressure applied between the outer race ring 21 and the nut member 18 that it is not entirely compressed. It still has an inherent resiliency enabling it to be further compressed. It is however, not advisable to further compress it excepting only very slightly so that it retains the nature of a safety factor or a reservoir against unusual or unexpected or excessive sharp shock pressures.

Figure 4:
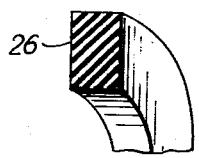
Fig. 4 is a fragmentary perspective of the rubber ring of the kind shown in Fig. 1, but in its repose position (not compressed)
Figure 4A:
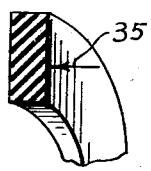
Fig. 4a is a like view but with the rubber partially compressed as in the position shown in Fig. 1, but still retaining a reservoir for inherent resiliency.
Figure 4B:
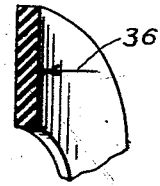
Fig. 4b is a like view but with the rubber compressed beyond its power to retain a reservoir for inherent resiliency, this view being for the purpose of illustration, and none of the views shown in Figs. 4, 4a and 4b, have friction films, which will be shown elsewhere.

In Fig. 4, the layer 26 is shown in its initial or expanded form; in Fig. 4a pressure has been applied as indicated by the arrow 35, and the washer has been partially compressed and radially lengthened. The shape of the washer shown in Fig. 4a is exactly the shape of the washer shown in Figs. 1 and 2. In Fig. 4b the washer has been still further compressed due to the action of the forces indicated by the arrow 36, and this state of compression is assumed as beyond the capacity of the rubber for any further inherent resiliency and is shown in order to illustrate that a fully compressed layer should not be used in the carrying out of this invention, since such a fully compressed layer does not have any further inherent resiliency, or any reservoir or any safety factor, and in consequence cannot be applied for the purpose of carrying out this invention. The use of such a highly compressed layer would bring about a pitting of the race in the manner shown in Figure 5 under the operation shown in Fig. 7. To carry out the invention it is necessary to retain a certain amount of inherent resiliency, and this certain amount may be referred to as a reservoir of inherent resiliency. While the shape of the layer shown in Figs. 1, 2 and 4a, may be slightly further compressed and still retain a reservoir of inherent resiliency, it must not be compressed to the degree shown in Fig. 4b. The description just made relates to the characteristic of the layer insofar as inherent resiliency is concerned.

Figure 7:
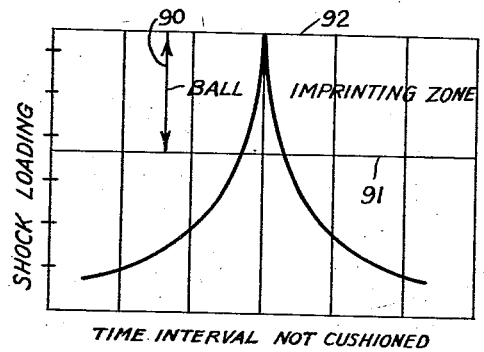
Fig. 7 is a diagram chart to show how the sharp shock or impact load enters the ball imprinting zone when no cushioning is present.
Figure 8:
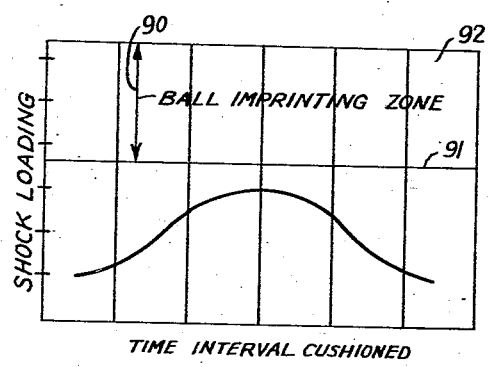
Fig. 8 is another diagram or chart to show that where cushioning is present the sharp shock or impact load does not exceed a certain amount whereby the cushioning decreases the instantaneous load peak so that there still remains a safety factor or a reservoir of inherent resiliency before ball imprinting takes place.

In order to clearly demonstrate the relationship of the cushioning effect of the rubber washer necessitating a reservoir for further inherent resiliency, the charts shown in Figs. 7 and 8 show as the abscissa the time interval and the ordinate the shock load. In such cases where a ball bearing has no cushioning layer, as in Fig. 7, the curve rises sharply to the point corresponding to the greatest shock force in the almost instantaneous time interval, and then descends. This Fig. 7 curve is based upon actual tests. The ball imprinting zone is defined by the limits of the greatest sharp shock force as indicated by horizontal line 92 down to a lower shock load indicated by the horizontal line 91 at the lower end of the double pointed arrow 90. It will therefore be seen from an examination of this curve that where there is no cushioning effect the race of a ball bearing will be ball imprinted when the sharp shock load force exceeds a certain amount. In Fig. 8 however, is shown a relationship where a cushioning layer is applied and it will be noted that the shock load is absorbed in the time interval provided by cushioning to such an extent that its force does not reach the lower range corresponding to imprinting, namely the horizontal line 91. As the curve does not extend to the lower limit of the ball imprinting zone, there is still left a reservoir of inherent resiliency to take care of shock loads greater than the average intended to be assumed by the particular rubber layer or washer placed between an outer race or an inner race of a ball bearing, and some restraining member of the rubber layer.

Figure 21:
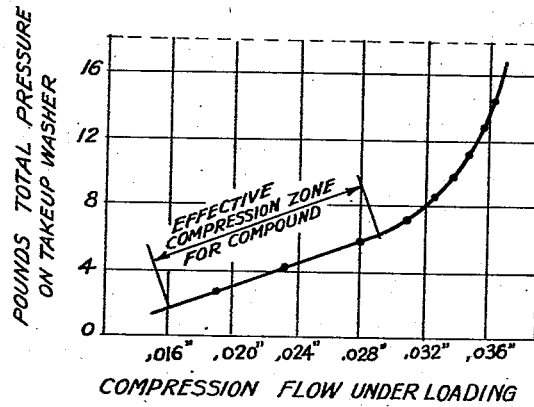
Fig. 21 is a chart showing the ratio of compression flow under load and pressure applied for sponge rubber which would be used for light load thrust applications.

In Fig. 21 is shown a chart showing the ratio of compression flow to load of the sponge rubber tested which is generally used for cases of lighter thrust loads. The abscissa shows the compression flow under loading, and the ordinate the pounds total pressure on the take up washer or layer. The effective compression zone of such a soft compound (sponge rubber) might be between about 2 pounds with compression .016 and six pounds pressure, with compression flow at .030, as indicated by the words "Effective compression zone for compound," depending of course upon the effective area and thickness of the rubber being compressed. It will be noted that the curve rises steeply after its straight line portion indicating that its reserve reservoir of resiliency is almost used up. Another piece of sponge rubber would have slightly different results depending upon its particular compounding, but in general similar thereto.

Figure 22:
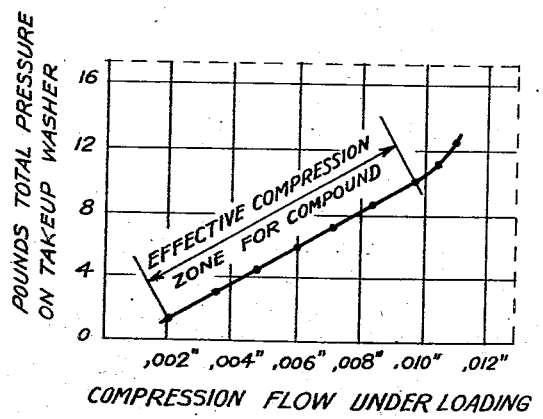
Fig. 22 shows a similar chart for a plain rubber which initially has a considerably greater degree of hardness than sponge rubber, the charts of Figs. 21 and 22 showing characteristics of rubber suitable to carry out the pit preventing invention.

In Fig. 22 is shown a chart for a plain rubber (not sponge rubber) compound of considerably greater degree of hardness than the aforesaid sponge rubber. The range here is from about 1½ pounds total pressure and .002 inch compression flow, to about 10 pounds total pressure and .009 inch compression flow as indicated by "Effective compression zone for compound." Again the curve rises sharply after its straight line portion, indicating again that its reserve reservoir of resiliency is almost used up.

Figures 23, 24:
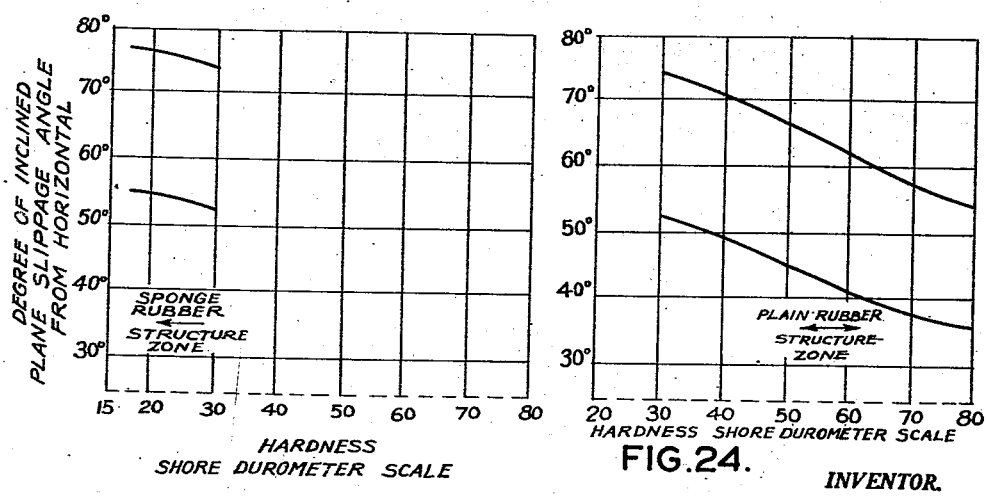
Fig. 23 shows a chart showing the ratio of the slippage angle (coefficient of friction) with two types of surface frictional resistance films and the hardness of the rubber, this chart being for sponge rubber.
Fig. 24 shows a chart like Fig. 23, but now for plain rubber.

Fig. 23 is a chart showing the relation of the slippage angle (or coefficient of friction) with the hardness of sponge rubber with a film. There are shown two different types of surface for the rubber, one, the upper one using a Cellophane surface on the mold used to provide the rubber, and the other, or lower one using a parchment surface on the mold used to produce the rubber, the former providing the smoother surface of the rubber.

In Fig. 24 similar charts are shown, one, the upper, for the Cellophane surface, and one, the lower, for the parchment surface, both for plain (not sponge) rubber. From the curves of Figs. 23 and 24, it is seen, that with the same film finish the harder the background the more the slippage in terms of a lower inclined angle in test, so that to get the best slippage factor of a certain finish it is best to have a softer backing to the finish. Charts in Figs. 23 and 24 are based on the incline plane friction tests of A. S. T. M. Again, in selecting the layer with a holding or friction force, such rubber should be selected within the range given by the charts of Figs. 23 and 24. When selecting reservoir layer, rubber charts similar to those of Figs. 21 and 22 should be followed. And when these two features or inventions are joined all charts must be taken into consideration.

In Figs. 9 to 20, I have shown various embodiments of my invention utilizing the foregoing principles.

Figure 9:
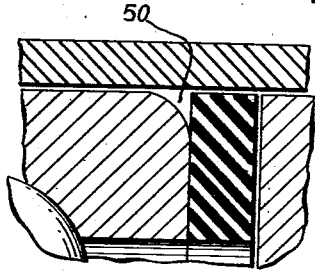
Fig. 9 is a fagmentary section of an embodiment of my pit-preventing invention, such as shown in Fig. 1, and with the layer of rubber not compressed but fully expanded.
Figure 10:
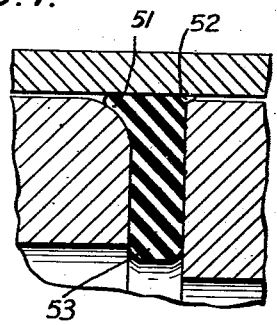
Fig. 10 is a like view, showing the same layer compressed as when in use, and showing how the layer expands into the spaces of the adjacent parts.
Figure 11:
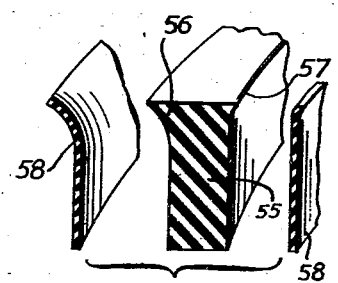
Fig. 11 shows a layer of rubber now of an initial configuration as shown in Fig. 10, and with separate surface films or shims having friction increasing characteristics.
Figure 12:
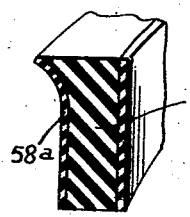
Fig. 12 shows the rubber layer and films of Fig. 11 integrally joined.
Figure 13:
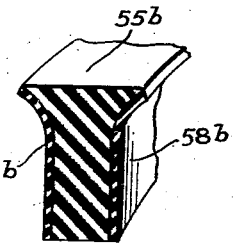
Fig. 13 shows the same structure as in Fig. 12 in duplex form for a bearing on each side thereof.

In Fig. 9, a rubber layer generally like that of Fig. 1, is shown. With a suitable further compression force, this washer is converted to the shape shown in Fig. 10, in which the upper end of the washer viewed in respect to Fig. 10 is shaped to enter the curved recess 50 (Figure 9) and to take a shape as shown by 51 in Fig. 10. Likewise the rubber layer will exude between the nut and the housing as shown by the portion 52 as shown in Fig. 10. Both of these portions 51 and 52 extend circumferentially around the outer race and the enclosing nut, providing extra large area of gripping power aided by the wedging effect at the corner of the bearing ring and at the corner of the nut. Furthermore, the rubber exudes to form a protuberance of rounded shape as indicated at 53 in Fig. 10. Figs. 9 and 10 can be viewed as having friction skin surfaces on the rubber layer facing the outer race ring and facing the nut face respectively or viewed merely as a rubber layer without such friction skin surfaces and intended to be used merely to absorb shock without the additional attribute of frictionally holding the outer race ring from rotating. In Fig. 11, I have shown a rubber layer ring or layer shaped to correspond to the final shape shown in Fig. 10, and this layer 55 has a curved portion 56, a ridge portion 57, all like that shown in Fig. 10, and to this layer 55, shims 58 of friction producing substance may be applied and made part thereof by vulcanization or otherwise, or as before stated, the layer 55 may be immediately provided in the course of its manufacture with skin friction surfaces analogous to the shims 58. The joinder of the rubber washer 55 and the shims 58 integrally connected, is shown in Fig. 12 with the layer 55a and friction or shim surfaces 58a. If it is desired to have a structure such as Fig. 12, but in such form for use with two bearings or two outer race rings, the duplex form of washer 55b has friction surfaces 58b. The structures shown in Figs. 12 and 13 are the initial structures having such attributes as to be capable of being pressed with a reservoir remaining, but not intended to be compressed beyond that point.

Figure 14:
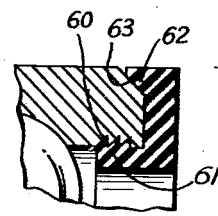
Fig. 14 shows another embodiment, in which the rubber layer is fastened to the outer race ring by grooves and ridges, and showing the same in initial or uncompressed position.
Figure 15:
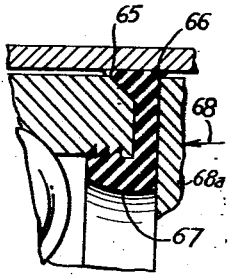
Fig. 15 shows the same embodiment as shown in Fig. 14, but now compressed by external means applied thereto; the friction increasing surface is not shown in Figs. 14 and 15, though it may be applied to the faces of the rubber layer.

In Fig. 14, the outer race ring has an interior series of grooves 60 and the rubber layer is shaped to have a series of ridges on the arm 61 and at the same time to have an inclined surface 62 abutting against the inclined surface 63 of the outer race ring. In this case, the rubber layer may be snapped into position and used or supplied with the outer race ring, that is, with the entire ball bearing. When pressure is applied to a layer of this type by a force 68 on a member 68a, it then provides the extensions 65 and 66 of the rubber and an inner rounded contour 67 as shown in Fig. 15. The exterior face of the rubber layer, which face abuts against the face of the member 68a may be provided with a friction film.

Figure 17:
Fig. 17 shows the same embodiment provided with friction films.
Figure 19:
Fig. 19 shows the same embodiment as shown in Fig. 18, but provided with friction films.
Figure 16:
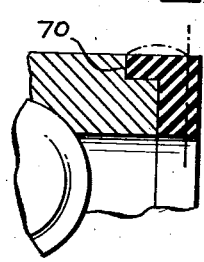
Fig. 16 shows another embodiment, engaging a cut out of the outer perimeter of outer race ring, and without friction films.
Figure 18:
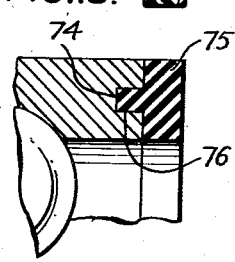
Fig. 18 shows another embodiment with a tongue and groove connection, and without friction films.
Figure 20:
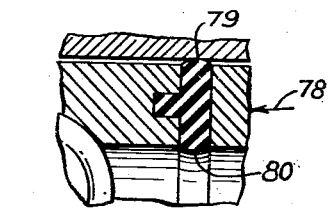
Fig. 20 shows the embodiment of Fig. 18, with external pressure applied.

Another form consists in providing a cutout to form a shoulder 70 and to have the rubber layer of inverted L-shape as shown in Fig. 16. When pressed, the layer forms a circular contour shown in dotted lines. This type is shown in Fig. 16 and if it be desired to provide skin surfaces, such a form is shown in Fig. 17, the skin or film surfaces being indicated by 72. The outer race ring might be provided in its outer planular surface with a groove recess 74 and the rubber layer 75 provided with a tongue projection 76 to enter said recess, and if it be desired to provide skin surfaces, these are indicated in Fig. 19 by 77. When a structure such as shown in Fig. 18 is subjected to pressure indicated by the arrow 78 in Fig. 20, the circular contour 79 and 80 are thereby formed.

Figure 5:
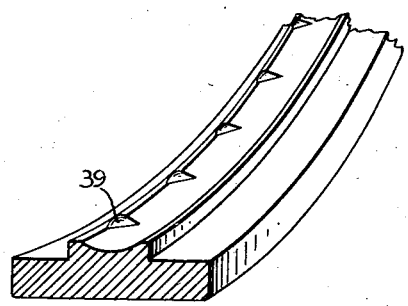
Fig. 5 is a fragmentary perspective of an outer race ring, broken away, and showing pitting of the same.
Figures 6, 6A:
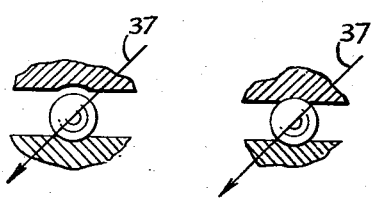
Fig. 6 is a diagrammatic fragmentary drawing of races and a ball therebetween to show a loose relationship, to illustrate a condition wherein any shock or impact applied will readily pit the race.
Fig. 6a is a diagrammatic drawings of the same parts but showing the same in a tight relationship to illustrate that in such a condition part of the shock or impact may be absorbed.

The importance of the relationships just described will be recognized from the fact that ball bearings of the type described when applied to devices such as skating wheels very frequently are subjected to extreme shocks or diagonal forces such as indicated by the arrow 37 in Figs. 1 and 6a. In such cases, the entire diagonal pressure may be translated to one or two of the balls of the ball bearing, and thereby the balls are forced into the race of the race ring whereby a pitting or indentation results. When such pitting takes place near the edge of the race the resultant vibration may bring about an enlargement of the pits or indentations. Races of ball bearings very frequently present a pitting action such as shown in Fig. 5, in which 39 indicates the average form of pit resulting from the ball impressing itself into the race.

Another reason for pitting is a condition where the races are too loosely spaced with respect to the balls as in Fig. 6. Assuming the upper race in Fig. 6 be subjected to a quick downward or axial movement, then it will move downwardly or laterally and transpose its force to the ball, and the ball will transpose its so acquired force to the lower race ring and its race. This rapid action will indent the race as shown in Fig. 5. If however, this same shock force be applied to a ball and race relationship as shown in Fig. 6a, wherein the races form a relative tight fit with the ball, then that same shock force will receive a certain amount of distribution and be more evenly distributed in the parts, and the intensity of the force upon the lower race will be somewhat less than that of Fig. 6. The improved reservoir layer and the friction film however absorb the shock and impact forces, irrespective of the bearing looseness initially.

It has been found that in the use of an anti-friction bearing such as shown in Fig. 1, when used with a housing member such as shown in Fig. 1, that while the fit is close, it is not sufficiently tight as to prevent a relative movement between the outer race ring and its enclosing housing member. These contacting surfaces are not sufficiently close to act upon each other in a binding manner, and consequently there is a slippage or relative movement between the outer race ring and the housing member, causing wear, increasing looseness and noise. This is particularly so since in the embodiment shown in Fig. 1, the outer race ring continually rotates in contrast to the more general use of an anti-friction ball bearing in which the outer race ring is stationary and the inner race ring rotates. In the embodiment shown in Fig. 1, the inner race ring is stationary as it is secured in the manner before described, to the stationary roller skate shaft 27.

Figure 3A:
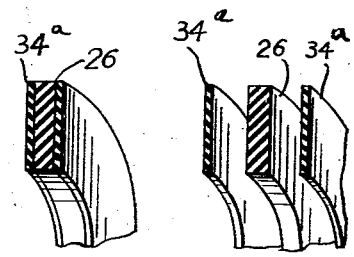
Fig. 3a is another form thereof, with the friction films separated from the body of the rubber ring.
Figure 1A:
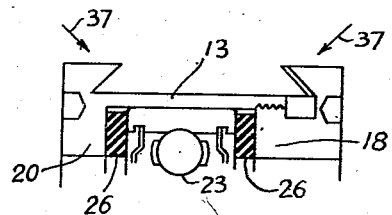
Fig. 1a is a similar section, but diagramatically and fragmentary, to show a bearing with a pitting preventing means on both sides of the outer race ring.

In order to prevent this slippage, the rubber layer or washer 26 is provided at its surfaces 30 and 33 with skin surfaces of a character to exert the largest possible friction between such skin surfaces and the outer surface of the outer race ring and inner face of the nut respectively. It is known in physics that where two very highly polished surfaces are placed in contact with each other, the planular relationship is such that all air is excluded and thereby the two contacting surfaces adhere to each other in such a manner that it is difficult, if not impossible, to move one surface in respect to the other. This physical phenomenon is availed of by providing the surface 30 of the rubber washer for example with such a planular relationship that it coacts with the planular relationship of the outer face of the outer race ring in such a manner that the outer race ring is, so to say, keyed to the rubber washer 26. These skin surfaces 34a may be made integral with the rubber washer 26 as shown in Fig. 3, or may be made in the form of separate shims such as shown in Fig. 3a in which latter figure the rubber washer 26 and the skin surface shims 34a are spaced from one another. These shims with thin skin surfaces are preferably combined with the body portion of the rubber washer as shown in Fig. 3, or if desired, Figs. 4, 4a and 4b may be considered as having such skin surfaces.

The criterion as to the shock absorbing layer is that after the maximum shock force to which the use of the bearing is expected to be subjected has been determined, about a third of the thickness of the absorption depth is added to act as a reservoir for unexpected forces. From the boundary of the invention it is sufficient if there be some depth beyond the normal maximum absorption depth, so that most if not all of the shock forces be absorbed instead of being transmitted to the bearing. The criterion as to the friction causing film is that it has the character of its surface so related to the character of the contiguous surfaces that no relative movement of these surfaces can take place. The character of these surfaces can be ascertained and predetermined by tests and by tables formed from prior tests.

The conjoint action of both of these inventions is such that slippage of the race ring in its housing is prevented, and that shock loads are absorbed, whereby pitting is prevented.

Wherever rubber is spoken of it is intended that there be included therein a synthetic rubber or a compound of rubber, or any other material having substantially the same vibration and force absorbing factor, inherent resiliency and friction creating characteristics.

I have described several forms of my invention, but obviously various changes may be made in the details disclosed without departing from the spirit of the invention as set out in the following claims.

What I claim is:

1. In a bearing mounting for a cylindrically bored housing having internal shoulders with oppositely disposed parallel faces relatively movable towards each other, an outer race ring having lateral faces and a cylindrical external contour slidably seated in the bore of the housing between said parallel faces of the shoulders, and a rubber ring interposed between one of the shoulder faces and one of the race ring faces, the sides of the rubber ring being contiguous to said faces, the combination of means for partially compressing the rubber ring between the contiguous race ring face and contiguous shoulder face to absorb the axial component of any diagonal shock load to which the mounting is subjected, means for locking the face of the shoulder to the contiguous side face of the rubber ring preventing relative movement therebetween when the ring is partially compressed, and means on the face of the rubber ring contiguous to the race ring face having a relatively high coefficient of friction preventing rotation of the race ring with respect to the rubber ring, whereby the rotation of the race ring in respect to the housing is prevented.

2. In a bearing mounting for a cylindrically bored housing having internal shoulders with oppositely disposed parallel faces relatively movable towards each other, an outer race ring having lateral faces and a cylindrical external contour slidably seated in the bore of the housing between said parallel faces of the shoulders, and a rubber ring interposed between one of the shoulder faces and one of the race ring faces, the sides of the rubber ring being contiguous to said faces, the combination of means for partially compressing the rubber ring between the contiguous race ring face and contiguous shoulder face to absorb the axial component of any diagonal shock load to which the mounting is subjected, means for locking the face of the shoulder to the contiguous side face of the rubber ring preventing relative movement therebetween when the ring is partially compressed, and means on the face of the rubber ring contiguous to the race ring face for locking the rubber ring to the race ring when the rubber ring is partially compressed, whereby the rotation of the race ring in respect to the housing is prevented.

EUGENE F. MARTINEC.